United States Patent [19]
Spruck

[11] Patent Number: 4,988,927
[45] Date of Patent: Jan. 29, 1991

[54] DEFLECTION CIRCUIT FOR A TELEVISION PICTURE TUBE

[75] Inventor: Manfred Spruck, Villingen, Fed. Rep. of Germany

[73] Assignee: Deutsche Thomson-Brandt GmbH, Villingen-Schwenningen, Fed. Rep. of Germany

[21] Appl. No.: 407,374

[22] Filed: Sep. 14, 1989

[30] Foreign Application Priority Data

Sep. 14, 1988 [DE] Fed. Rep. of Germany ....... 3831239

[51] Int. Cl.$^5$ .............................................. H01J 29/56
[52] U.S. Cl. ..................................... 315/371; 315/408
[58] Field of Search ............................. 315/371, 408

[56] References Cited

U.S. PATENT DOCUMENTS

| | | | |
|---|---|---|---|
| 3,662,102 | 5/1972 | Herndon | 178/77 |
| 4,176,300 | 11/1979 | Waehner | 315/371 |
| 4,672,449 | 6/1987 | Kraus et al. | 358/148 |
| 4,680,599 | 7/1987 | Wertz et al. | 340/744 |
| 4,766,354 | 8/1988 | Oliver | 315/371 |

FOREIGN PATENT DOCUMENTS

| | | |
|---|---|---|
| 0175409 | 3/1986 | European Pat. Off. |
| 0200116 | 11/1986 | European Pat. Off. |
| 0246339 | 11/1987 | European Pat. Off. |
| 0253608 | 1/1988 | European Pat. Off. |
| 1274624 | 8/1968 | Fed. Rep. of Germany |
| 2808224 | 9/1979 | Fed. Rep. of Germany |
| 3711173 | 10/1988 | Fed. Rep. of Germany |

OTHER PUBLICATIONS

Murphy, A. S.; Bidirectional Scan for CRT; IBM Tech. Disclosure Bulletin, vol. 21; No. 12; May 1979, pp. 5025–5026.

Kraus, Uwe E.; Symmetric Line Deflection for Colour TV Receivers with Enhanced Picture Quality; IEEE Transactions on Consumer Electronics; vol. CE-31; No. 3; Aug. 1985, pp. 255–261.

*Primary Examiner*—Theodore M. Blum
*Attorney, Agent, or Firm*—Joseph S. Tripoli; Joseph J. Laks; Harvey D. Fried

[57] ABSTRACT

A deflection circuit for a television picture tube comprises a horizontal generator producing a first, symmetrical output current. A corrective current is generated from the first output current. The corrective current and the first output current change in value oppositely to one another at times. A vertical generator produces a second output current. The second output current and the corrective current are summed to form a composite current having a stairstep configuration. An amplitude control circuit for the composite current adjusts horizontal segments of the stairstep. A composite control signal for the amplitude control circuit is developed from the horizontal and vertical generators. A vertical sweeping coil is coupled to the amplitude control circuit and controlled by the composite current.

22 Claims, 4 Drawing Sheets

FIG. 6a  $U_s$
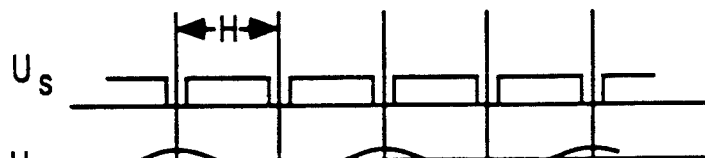
FIG. 6b  $U_g$
FIG. 6c  $U_{kg}$
FIG. 6d  $U_u$
FIG. 6e  $U_{k(eff)}$
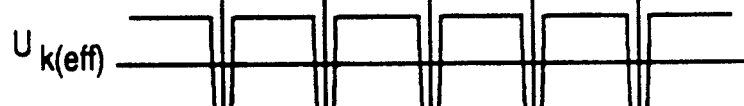
FIG. 6f  $i_k$
FIG. 6g  $i_v$
FIG. 6h  $i_k + i_v$
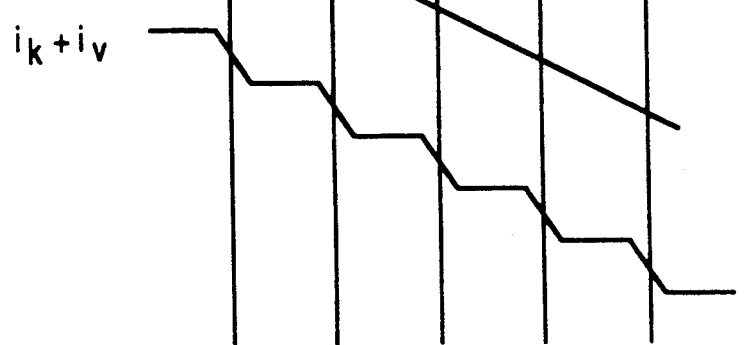

FIG. 7a $i_{VT}$ 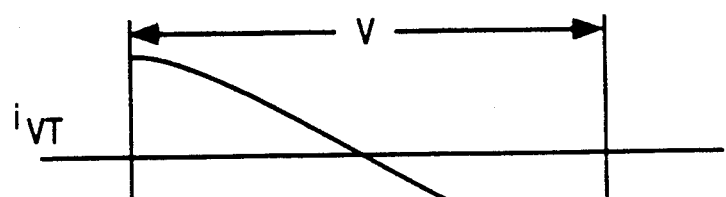
FIG. 7b $U_{ks}$ 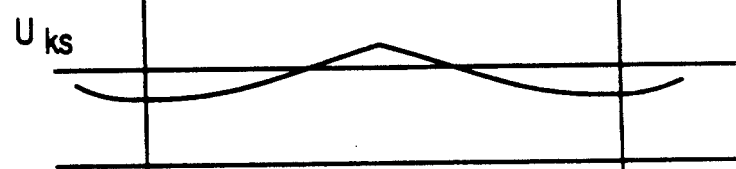
FIG. 7c $i_{k(env)}$ 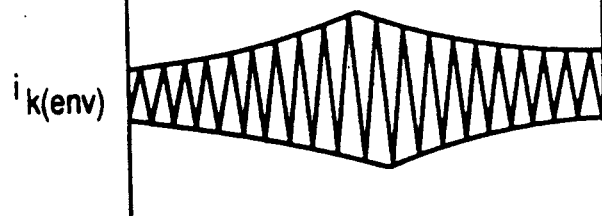

DEFLECTION CIRCUIT FOR A TELEVISION PICTURE TUBE

The invention relates to the field of deflection circuits for television picture tubes, and in particular, to deflection circuits for generating a raster by symmetric horizontal deflection.

Conventional deflection circuits in television picture tubes operate with a horizontal generator which produces an asymmetric output current. The electron beam is deflected along a respective horizontal scan line relatively slowly and thereby writes one line of picture information onto the screen. At the end of each line a relatively quick reverse motion is performed to effect a horizontal retrace, during which time no picture information is written onto the screen.

Deflection circuits of that kind require considerable power, especially in big, high brightness tubes. In this domain, alternative solutions such as deflection circuits with symmetric horizontal deflection are promising. In contrast to conventional deflection circuits, bidirectional deflection circuits make it possible to write the picture information allocated to the lines in both deflecting directions, at one half of the deflecting frequency and with less electrical power.

Bidirectional horizontal deflection does not, in and of itself, interfere with the vertical deflection. However, bidirectional horizontal deflection presents a disadvantage regarding the vertical spacing or distance between the horizontal scan lines. In particular, this spacing is not constant over the entire length of the line. The line spread apart from one another moving outwardly from the respective change of scanning direction turning points. This is illustrated in the top part of FIG. 2.

It is therefore an aspect of the invention to provide an improved bidirectional deflection circuit, for example a symmetrically scanned deflection circuit, in which the horizontal scan lines remain substantially parallel to one another and evenly spaced. In accordance with this aspect of the invention a deflection circuit, for a television picture tube, comprises: a horizontal generator producing a first symmetric output current; a vertical generator producing a second output current; and, a vertical sweeping coil controlled by the second output current and by a corrective current developed from the first output current. The corrective current and the first output current change in value oppositely to one another at times. The second output current and the corrective current are summed to form a composite current having a stairstep configuration. An amplitude control circuit for the composite current adjusts horizontal segments of the stairstep. A composite control signal for the amplitude control circuit is developed from the horizontal and vertical generators. The vertical sweeping coil is coupled to the amplitude control circuit and controlled by the composite current.

A correction current is superimposed on the output current of the vertical generator. As a result, the deflection current becomes discontinuous in the horizontal direction. It is therefore possible, firstly, to lead the electron beam horizontally across the screen, that is, without any vertical deflection. At the change of direction turning points, which lie outside the visible section of the screen, the electron beam can then be vertically deflected, that is, shifted downwardly, by one line width for noninterlaced scanning, or by two line widths for interlaced scanning. Then, the electron beam can again be lead horizontally across the screen, without vertical deflection, but this time, in the opposite direction. The horizontal scan lines which are written in this manner are adjusted horizontally, and therefore, are parallel to one another.

In accordance with another aspect of the invention, tangent peaking at the vertical deflection is taken into consideration. Tangent peaking presents itself as an s-shaped flattening of the output current of the vertical generator. In accordance with this aspect of the invention, the first control signal, which is fed to the amplitude control circuit, causes a change in the corrective current, so that the output current is again modulated, that is, impresed with a signal, downstream from the adding circuit.

In accordance with yet another aspect of the invention, cross-talk effects between the horizontal and the vertical scanning stages are compensated for. Such cross-talk would alternately enhance the effect of the invention and counteract the effect of the invention during every other horizontal scanning line, respectively. The effects of cross-talk can be compensated for by feeding a second control signal to the amplitude control circuit.

FIG. 1(*a*) is a diagram of an interlaced, asymmetrically scanned raster.

FIGS. 1(*b*) and 1(*c*) are the vertical and horizontal deflection currents respectively for the raster shown in FIG. 1(*a*).

FIG. 2(*a*) is a diagram of an interlaced, symmetrically scanned raster, demonstrating the problem of adjacent horizontal scanning lines spreading apart.

FIGS. 2(*b*) and 2(*c*) are the vertical and horizontal deflection currents respectively for the raster shown in FIG. 2(*a*).

FIG. 3(*a*) is a diagram of an interlaced, symmetrically scanned raster in accordance with an aspect of the invention.

FIGS. 3(*b*) and 3(*c*) are the vertical and horizontal deflection currents respectively for the raster shown in FIG. 3(*a*).

Figure 4:
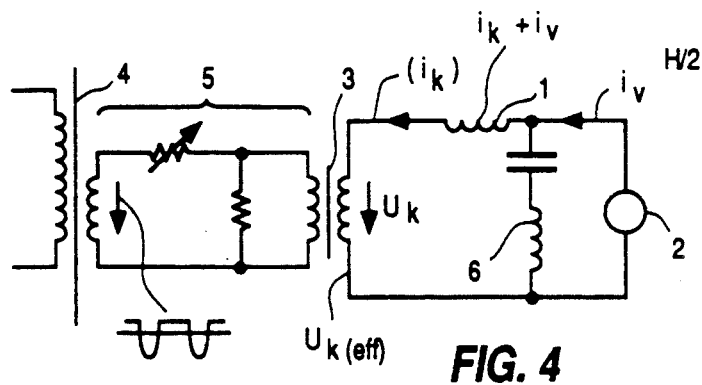
FIG. 4 is a circuit diagram illustrating operating principles of the invention.
Figure 5:
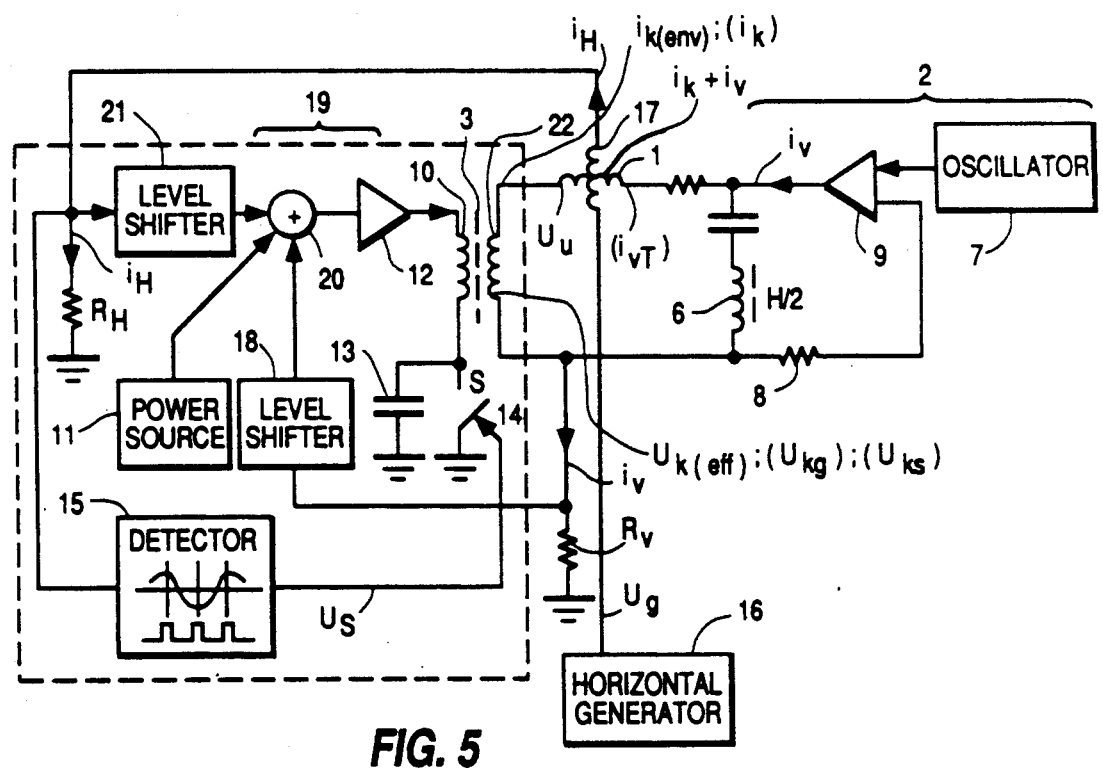
FIG. 5 is a schematic for implementing the circuit shown in FIG. 4 in accordance with an aspect of the invention.

FIGS. 6*a*–6*h* and 7*a*–7*c* are diagrams of voltages and currents according to the operation of the circuits shown in FIGS. 4 and 5.

Figure 1A:
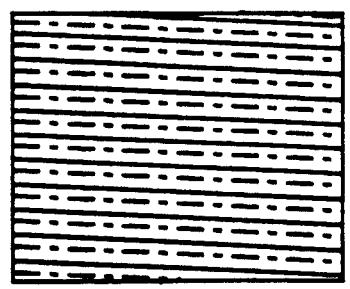
Figure 1B:
Figure 1C:
Figure 2A:
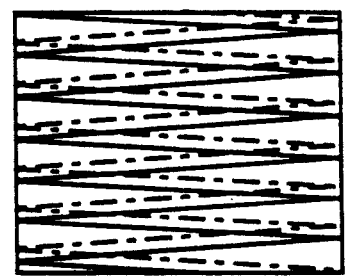
Figure 2B:
Figure 2C:
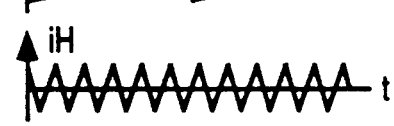
Figure 3A:
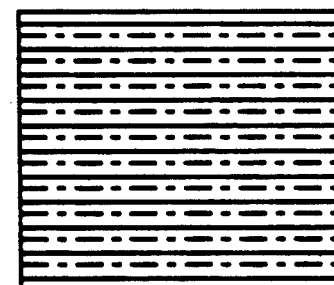
Figure 3B:
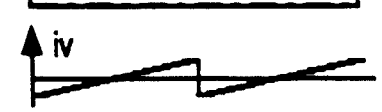
Figure 3C:

The rasters depicted in FIGS. 1–3 all show video image frames formed by interlaced scanning of successive fields. One field is shown by solid lines and the other field is shown by dash-dot lines. The raster shown in FIG. 1 results from asymmetric horizontal scanning, that is, with alternate trace and retrace paths. The rasters shown in FIGS. 2 and 3 result from symmetric horizontal scanning, that is, bidirectional scanning, without retrace paths.

The raster shown in FIG. 1 is representative of conventional deflection circuits, that is, those utilizing sawtooth type deflection currents as shown in FIGS. 1(*b*) and (1*c*) along the time axis for driving both the vertical sweeping coil and the horizontal sweeping coil. The lines in which the picture information is written are sloped (angular), but parallel to each other. In spite of the slope towards the horizontal, a flawless picture image is produced.

The raster shown in FIG. 2(a) has the same vertical deflection current as the raster shown in FIG. 1, but the horizontal deflection current is symmetrical, as shown in FIG. 2(c). Starting from the change of scanning direction turning points, successive and adjacent scan lines in each field spread aparat, so that a zig-zag shaped raster is produced. The picture image in this case is unsatisfactory.

In order to generate the raster shown in FIG. 3, the horizontal sweeping coil is supplied with the same symmetric horizontal deflection current as the raster shown in FIG. 2. However, the vertical deflection has changed. Instead of a steady or continuous current waveform between the change of horizontal scanning direction turning points, the vertical sweeping coil is supplied with a current which has a stairstep-shaped waveform along the time axis, as shown in FIG. 3(b). As a result, no vertical deflection of the electron beam takes place during the portions of the current waveform corresponding to the horizontal traverse of the scan lines. Instead, the electron beam is lead horizontally across the screen by the horizontal deflection current. It is only at the horizontal turning points that vertical deflection takes place, by incremental steps or jumps. In accordance with this aspect of the invention, all of the scan lines are deflected on paths which are parallel to one another and at uniform spaced intervals, whereby a flawless picture image is produced.

The waveforms shown in FIGS. 6 and 7 relate to operation of the circuts shown in FIGS. 4 and 5. The waveforms are referenced in FIGS. 4 and 5 by lead lines, wherever appropriate. Whenever such waveforms are identifiable as such, the waveform name appears without parentheses. However, where the waveform is a component of a composite waveform, the waveform name is placed in parentheses.

FIG. 4 shows a circuit for generating a stairstep shaped current waveform in the vertical sweeping coil along the time axis. The circuit comprises a vertical sweeping coil 1 which is coupled between a vertical generator 2 and a transformer 3. An output current $i_v$ is fed into the vertical sweeping coil from the vertical generator 2 and a corrective current $i_k$ is fed into the vertical sweeping coil from the tramnsformer 3. The currents are summed to form a composite vertical deflection current $i_k + i_v$.

The current waveforms are shown in FIGS. 6(f), 6(g), and 6(h). The corrective curent $i_k$ is produced by a corrective voltage $u_k$, which is coupled from a high voltage generator (not shown) of a television set by means of a transformer 4. The amplitude of the corrective current $i_k$ can be controlled by means of an amplitude control circut 5 in such a way that the slope of its leading edge is equal to the slope of the trailing (decay) edge of the output current, $i_v$, and the composite vertical deflection current $i_k + i_v$ receives horizontal parts. Finally, this circuit is designed in such a way that a tuned circuit 6 is connected in parallel with the vertical generator 2. The tuned circuit is tuned to a frequency related to the frequency of a horizontal generator, for example one half of the line deflection frequency, H/2, or related to the freqeuncy of the corrective current $i_k$, which corresponds to that of the horizontal generator. This tuned circuit 6 acts as a filter for the vertical generator 2 with respect to high frequencies for the corrective current $i_k$.

FIG. 5 shows an advantageous implementation of the circuit according to an aspect of the invention. Additional measures are taken in accordance with a further aspect of the invention to effect tangential equalizing at the output current of the vertical generator and to control crosstalk between the horizontal and vertical sweeping coils.

The vertical sweeping coil 1 is the same as the one shown in FIG. 4. The verticl generator 2 comprises an oscillator 7 and a driver stage 9, which is equipped with a feedback path 8. The tangentially peaked output current $i_{vT}$ is shown in FIG. 7(a). Tangential peaking takes into account that with an increase in the vertical deflection angle, the deflection steps must be decreased in order to assure the same distance between the lines as in the middle of the screen.

Transformer 3 is the same as the one shown in FIG. 4. The corrective current $i_k$ is developed in the primary winding 10 of the transformer 3. A power source 11 is connected to the primary winding 10 of the transformer 3 via a further driver stage 12, a capacitor 13 and a controlled switch 14. Negative voltage pulses are imposed upon the primary winding 10 as shown in FIG. 6(e) through periodic closing of switch 14 at those times when the electron beam has reached the change of horizontal direction turning points of the lines. These voltage impulses cause the trailing edges of the corrective current $i_k$ in FIG. 6(f). The opening of the switch 14 responsive to control signal $u_s$ shown in FIG. 6(a), during the intervals of the horizontal deflection of the electron beam, enables the capacitor 13 to be charged and causes the leading edges of the corrective current $i_k$ in FIG. 6(f) during this period of time.

A detector 15 is provided for controlling switch 14. The detector 15 receives a switch signal from the symmetrical output current $i_H$ of a horizontal generator 16, which feeds a horizontal sweeping coil 17. Horizontal output current $i_H$ is sampled by a sampling resistor $R_H$. The zero crossings of the output current are detected in detector 15 and the events are phase shifted by 90 degrees. The resulting switch signal then corresponds to the extreme values of the output current $i_H$, that is, to the values at the horizontal change of direction turning points of the electron beam at the left and right edges of the screen. & Tangent peaking of the output current $i_v$, also referred to as S-shaping, is taken into account by feeding a portion of current $i_v$ to an adaptation circuit 18, which can shift the level of the current $i_v$, for example by means of a transformer, an amplifier or an attenuator. Adapatation or level shifting circuit 18 develops a first control signal from the portion of the current $i_v$ sampled by resistor $R_V$, and feeds the first control signal to an amplitude control circuit 19. The amplitude control circuit receives the first control signal at a summing or adding point 20, at the input to the further driver stage 12. This measure produces the voltage curve $u_{ks}$, shown in FIG. 7(b), in the primary winding 10 of the transformer 3. Accordingly, the sawtooth waveform is amplitude modulated by the envelope $i_{k(env)}$ shown in FIG. 7(c). As a result, the tangent equalized output current $i_{vT}$ of the vertical generator 2 is always combined with additional corrective current $i_{ks}$, such that the combined vertical deflection current $i_k + i_{vT}$ is always characterized by horizontal segments or steps, which partition or interrupt the vertical deflection. The output current $i_v + i_k$ does not have segments having different slopes. Thus, the horizontal scanning lines do not have different slopes because those segments of the vertical deflecting current actually effecting vertical movement of the electron beam do not have different slopes. Accordingly, the horizontal scanning lines are parallel to one another.

Crosstalk caused by the design of the vertical and horizontal sweeping coils can cause an undesired superimposing of the combined vertical deflection current with an alternating current $u_u$, as shown in FIG. 6(d). Superimposing this alternating current would increase the rise time, or slope, of the corrective current $i_k$ during the run of one line and would reduce the rise time, or slope, when traversing the following line. As a consequence, only every second line of a field would run parallel, whereas consecutive lines would be inclined towards each other.

In accordance with a further aspect of the invention, this influence is eliminated. A part of the output current $i_H$ of the horizontal generator 12 is fed to the adding point 20 via a further adaptation or level shifting circuit 21 and superimposed upon the voltage present at the primary winding 10 of the transformer 3, as voltage $u_g$. The waveform of voltage $u_g$ is shown in FIG. 6(b). The corrective voltage $u_g$ produced in the switch position of the switch 14 can be seen in FIG. 6(c). The voltages $u_u$ and $u_g$ compensate each other through feedback reaction via the secondary winding 22 of transformer 3, in such a way that an alternating voltage is not superimposed on, or combined with, the effective corrective voltage $u_{k(eff)}$ as suggested in FIG. 6(e).

What is claimed is:

1. A deflection circuit for a television picture tube, comprising:
   a horizontal generator producing as a first output a horizontal deflection current for bidirectional scanning;
   a vertical generator producing as a second output a vertical deflection current;
   means for developing a corrective current in synchronism with said horizontal deflection current; and,
   a vertical sweeping coil controlled by said second output current and said corrective current, said corrective current providing predetermined spacing between adjacent horizontal scan lines.

2. The deflection circuit of claim 1, comprising a transformer for coupling said corrective current to said sweeping coil.

3. The deflection circuit of claim 1, comprising an amplitude control circuit coupled between said horizontal generator and said vertical sweeping coil.

4. The deflection system of claim 3, wherein said second output current and said corrective current form a composite output current having a stairstep configuration with horizontal segments adjustable by said amplitude control circuit.

5. The deflection circuit of claim 1, comprising a tuned circuit coupled in parallel with the vertical generator, said tuned circuit being tuned to a frequency related to operation of said horizontal generator.

6. The deflection circuit of claim 3, wherein said vertical generator is tangent equalized, and comprising a matching circuit for generating a first control signal from said second output current for said amplitude control circuit.

7. The deflection circuit of claim 6, wherein said horizontal generator supplies a second control signal to said amplitude control circuit.

8. The deflection circuit of claim 7, wherein said first and second control signals are fed to said amplitude control circuit as a summed control signal.

9. The deflection circuit of claim 2, comprising an amplitude control circuit coupled between said horizontal generator and said vertical sweeping coil.

10. The deflection system of claim 9, wherein said second output current and said corrective current form a composite output current having a stairstep configuration with horizontal segments adjustable by said amplitude control circuit.

11. The deflection circuit of claim 9, comprising a tuned circuit coupled in paralled with the vertical generator, said tuned circuit being tuned to a frequency related to operation of said horizontal generator.

12. The deflection circuit of claim 9, wherein said vertical generator is tangent equalized, and comprising a matcign circuit for generating a first control signal from said second output current for said amplitude control circuit.

13. The deflection circuit of claim 12, wherein said horizontal generator supplies a second control signal to said amplitude control circuit.

14. The deflection circuit of claim 13, wherein said first and second control signals are fed to said amplitude control circuit as a summed control signal.

15. A deflection circuit for a television picture tube, comprising:
   a horizontal generator producing as a first output a horizontal deflection current for bidirectional scanning;
   a vertical generator producing as a second output a vertical deflection current;
   means for developing an S-shaping corrective current synchronously with said deflection current; and,
   a vertical sweeping coil controlled by said second output current and said corrective current.

16. A deflection circuit for a television picture tube, comprising:
   a horizontal generator producing as a first output a horizontal deflection current for bidirectional scanning;
   a vertical generator producing as a second output a vertical deflection current;
   means for developing a composite corrective current, having a first component for S-shaping and having a second component developed from said horizontal deflection current; and,
   a vertical sweeping coil controlled by said second output current and said corrective current.

17. A deflection circuit for a television picture tube, comprising:
   a horizontal generator producing as a firt output a horizontal deflection current for bidirectional scanning;
   a vertical generator producing as a second output a vertical deflection current;
   means for developing an S-shaping corrective current;
   a vertical sweeping coil controlled by said second output current and said corrective current; and,
   an amplitude control circuit coupled between said horizontal generator and said vertical sweeping coil.

18. The defection circuit of claim 17, comprising means for generating a composite control signal for said amplitude control circuit, said composite control signal having a first component developed from said second output current and a second componnet supplied by said horizontal generator.

19. a deflection circuit for a television picture tube, comprising:
- a horizontal generator producing as a first output a horizontal deflection current for bidirectional scanning;
- a vertical generator producing as a second output a vertical deflection current;
- means for generating a composite corrective current, having a component developed from said horizontal deflection current and having an S-shaping component; and,
- a vertical sweeping coil controlled bys aid second output current said said corrective current, said corrective current providing predetermined spacing between adjacent horizontal scan lines.

20. The deflection circuit of claim 19, comprising an amplitude control circuit coupled between said horizontal generator and said vertical sweeping coil.

21. The deflection circuit of claim 20, comprising means for generating a composite control signal for said amplitude control circuit, said composite control signal having a first component developed from said second output current and a second component supplied by said horizontal generator.

22. A deflection circuit for a television picture tube, comprising:
- a horizontal generator producing as a first output a horizontal deflection current for bidirectional scanning;
- a vertical generator producing as a second coutput a vertical deflection current;
- means for generating a corrective current synchronized to said horizontal deflection current and modulated in accordance with vertical S-shaping; and,
- a vertical sweeping coil controlled by said second output current and said corrective current.

* * * * *

UNITED STATES PATENT AND TRADEMARK OFFICE
CERTIFICATE OF CORRECTION

PATENT NO. : 4,988,927

DATED : January 29, 1991

INVENTOR(S) : Manfred Spruck

It is certified that error appears in the above-identified patent and that said Letters Patent is hereby corrected as shown below:

Column 6, line 15, "matcign" should be --matching--.

Signed and Sealed this

Second Day of June, 1992

Attest:

DOUGLAS B. COMER

*Attesting Officer*   *Acting Commissioner of Patents and Trademarks*